US012772253B2

(12) United States Patent
Ahmadzadeh et al.

(10) Patent No.: US 12,772,253 B2
(45) Date of Patent: Oct. 20, 2026

(54) SRS BURSTS THROUGH MAC-CE ENHANCEMENT

(71) Applicant: Nokia Technologies OY, Espoo (FI)

(72) Inventors: Arman Ahmadzadeh, Munich (DE); Silvio Mandelli, Ludwigsburg (DE); Marcus Roland Henninger, Ludwigsburg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 632 days.

(21) Appl. No.: 18/309,271

(22) Filed: Apr. 28, 2023

(65) Prior Publication Data

US 2024/0365329 A1 Oct. 31, 2024

(51) Int. Cl.

*H04W 72/231* (2023.01)
*H04B 7/0404* (2017.01)
*H04L 5/00* (2006.01)
*H04W 72/11* (2023.01)

(52) U.S. Cl.

CPC ........ *H04W 72/231* (2023.01); *H04B 7/0404* (2013.01); *H04L 5/0048* (2013.01); *H04W 72/11* (2023.01)

(58) Field of Classification Search

CPC ................ H04W 72/231; H04W 72/11; H04L 5/0048; H04B 7/0404

See application file for complete search history.

(56) References Cited

U.S. PATENT DOCUMENTS

2016/0227458 A1* 8/2016 Lee ..................... H04W 36/165
2022/0295499 A1 9/2022 Rahman et al.
2023/0246679 A1* 8/2023 Patchava ............. H04L 27/2639 375/262
2025/0097877 A1* 3/2025 Zorgui .................. H04L 5/0048

OTHER PUBLICATIONS

International Search Report and Written Opinion for corresponding International application No. PCT/EP2024/060069 dated Jul. 4, 2024.
'Initial Study on Integrated Sensing and Communication for NR' *3GPP TSG RAN Meeting #99, RP-230378*, Rotterdam, Netherlands, Mar. 20-23, 2023, pp. 1-23.
'3rd Generation Partnership Project; Technical Specification Group Radio Access Network' *Radio Resource Control (RRC) protocol specification*, (*Release 17*), 3GPP TS 38.331 V17.4.0, 2023, pp. 1-1324.
'3rd Generation Partnership Project; Technical Specification Group Radio Access Network' *Medium Access Control (MAC) protocol specification*, (*Release 17*), 3GPP TS 38.321 V17.4.0, 2023, pp. 1-252.

* cited by examiner

*Primary Examiner* — Omar J Ghowrwal
(74) *Attorney, Agent, or Firm* — Carter, DeLuca & Farrell LLP

(57) ABSTRACT

An apparatus includes at least one processor and at least one memory. The at least one memory stores instructions that, when executed by the at least one processor, cause the apparatus to: receive a medium access control (MAC)-control element (CE) message; determine a sensing signal burst configuration based on the MAC-CE message, the sensing signal burst configuration including at least one of a burst periodicity or a burst length of a signal burst; and transmit the sensing signal burst according to the sensing signal burst configuration.

3 Claims, 8 Drawing Sheets

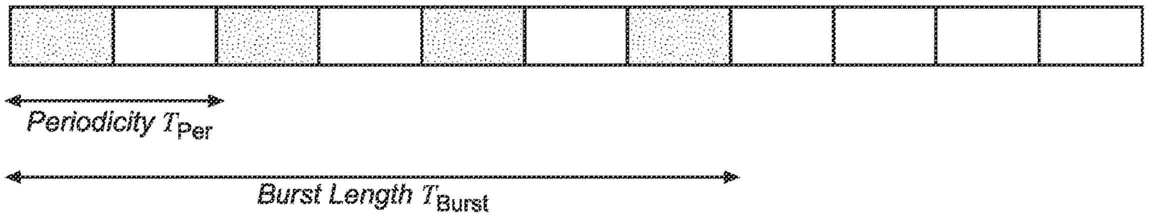

FIG. 1

```
SRS-ResourceSet ::=                    Sequence {
    srs-ResourceSetId                      srs-ResourceSetId,
    srs-ResourceIdList                     srs-ResourceSetId,                                   OPTIONAL, -- Cond Setup
    resourceType                           SEQUENCE (SIZE(1..maxNrofSRS-ResourcesPerSet)) OF SRS-ResourceId
        aperiodic                          CHOICE {
            aperiodicSRS-ResourceTrigger       SEQUENCE {
            csi-RS                                 INTEGER (1..maxNrofSRS-TriggerStates-1),     OPTIONAL, -- Cond NonCodebook
            slotOffset                             NZP-CSI-RS-ResourceId                        OPTIONAL, -- Need S
            ...,                                   INTEGER (1..32)
            [[
            aperiodicSRS-ResourceTriggerList          SEQUENCE (SIZE(1..maxNrofSRS-TriggerStates-2))
                                                          OF INTEGER (1..maxNrofSRS-TriggerStates-1)  OPTIONAL, -- Need M
            ]]
        },
        semi-persistent                        SEQUENCE {
            associatedCSI-RS                       NZP-CSI-RS-ResourceId                        OPTIONAL, -- Cond NonCodebook
            ...
        },
        periodic                               SEQUENCE {
            associatedCSI-RS                       NZP-CSI-RS-ResourceId                        OPTIONAL, -- Cond NonCodebook
            ...

    },
    usage                                  Enumerated (beamManagement,codebook, noncodebook, antennaSwitching),
    alpha                                  Alpha                                                OPTIONAL, -- Need S
    p0                                     INTEGER (-202..24)                                   OPTIONAL, -- Cond Setup
    pathlossReferenceRS                    PathlossReferenceRS-Config                           OPTIONAL, -- Need M
    srs-PowerControlAdjustmentStates       Enumerated { sameAsFci12, separateClosedLoop}        OPTIONAL, -- Need S
    ...,
    [[
    pathlossReferenceRSList-r16            SetupRelease { PathlossReferenceRSList-r16}          OPTIONAL, -- Need M
    ]],
    [[
    usagePDC-r17                           ENUMERATED (true)                                    OPTIONAL, -- Need R
    availableSlotOffsetList-r17            SEQUENCE (SIZE(1..4)) OF AvailableSlotOffset-r17     OPTIONAL, -- Need R
    followUnifiedTCIstateSRS-r17           ENUMERATED (enabled)                                 OPTIONAL, -- Need R
    ]]
```

FIG. 2

| Reserved bits $b_0b_1$ | Burst size/duration |
|---|---|
| 00 | Legacy behavior for SP SRS MAC-CE |
| 01 | 10 slots |
| 10 | 20 slots |
| 11 | 40 slots |

FIG. 9A

| Reserved bits $b_0b_1$ | Burst size/duration |
|---|---|
| 00 | Legacy behavior for SP SRS MAC-CE |
| 01 | 2 slots |
| 10 | 4 slots |
| 11 | 16 slots |

FIG. 9B

| Reserved bits $b_0b_1$ | Scaling factor $k$ |
|---|---|
| 00 | Legacy behavior for SP SRS MAC-CE |
| 01 | 1 |
| 10 | 2 |
| 11 | 3 |

FIG. 9C

```
SRS-PeriodicityAndOffset ::=          CHOICE {
    sl1                                   NULL,
    sl2                                   INTEGER (0..1),
    sl4                                   INTEGER (0..3),
    sl5                                   INTEGER (0..4),
    sl8                                   INTEGER (0..7),
    sl10                                  INTEGER (0..9),
    sl16                                  INTEGER (0..15),
    sl20                                  INTEGER (0..19),
    sl32                                  INTEGER (0..31),
    sl40                                  INTEGER (0..39),
    sl64                                  INTEGER (0..63),
    sl80                                  INTEGER (0..79),
    sl160                                 INTEGER (0..159),
    sl320                                 INTEGER (0..319),
    sl640                                 INTEGER (0..639),
    sl1280                                INTEGER (0..1279),
    sl2560                                INTEGER (0..2559)
}
```

FIG. 10

| Reserved bits $b_0b_1$ | Burst size/duration | Burst periodicity |
|---|---|---|
| 00 | Legacy behavior for SP SRS MAC-CE | Legacy behavior for SP SRS MAC-CE |
| 01 | 2 slots | 160 |
| 10 | 4 slots | 320 |
| 11 | 16 slots | 640 |

SRS BURSTS THROUGH MAC-CE ENHANCEMENT

TECHNICAL FIELD

One or more example embodiments relate to wireless communications networks employing sounding reference signal (SRS) burst transmissions configured through Medium Access Control (MAC)-Control Element (CE) enhancement.

BACKGROUND

Network sensing makes use of reflections of radio signals with objects in the environment, ideally with close to zero overhead with regard to legacy communication operations. With sensing, the network can be operated as a radar, allowing to estimate Doppler shift of signal transmissions, to obtain information about the speed of objects interacting with the signal that is received and processed at user equipment (UE) and/or gNBs. However, conventional methods for configuring burst transmissions to be used to estimate the Doppler shift introduce a relatively large signaling overhead.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides an apparatus including at least one processor, and at least one memory storing instructions that, when executed by the at least one processor, cause the apparatus to receive a medium access control (MAC)-control element (CE) message, determine a sensing signal burst configuration based on the MAC-CE message, the sensing signal burst configuration including at least one of a burst periodicity or a burst length of a signal burst, and transmit the sensing signal burst according to the sensing signal burst configuration.

The sensing signal burst may be a sounding reference signal (SRS) transmission. In combination with any of the above features, the MAC-CE message may be a semi-persistent (SP) sounding reference signal (SRS) Activation/Deactivation MAC-CE message.

In combination with any of the above features, the MAC-CE message may include at least one burst configuration bit indicating the sensing signal burst configuration.

In combination with any of the above features, the MAC-CE message may include at least one burst configuration bit and the at least one memory may store instructions that, when executed by the at least one processor, cause the apparatus to determine the sensing signal burst configuration based on the at least one burst configuration bit.

In combination with any of the above features, the MAC-CE message may include at least one burst configuration bit, and the at least one memory may store instructions that, when executed by the at least one processor, cause the apparatus to determine a scaling factor based on the at least one burst configuration bit, and determine the sensing signal burst configuration based on the scaling factor.

In combination with any of the above features, the MAC-CE message may include at least one burst configuration bit, and the at least one memory may store instructions that, when executed by the at least one processor, cause the apparatus to determine the burst length and the burst periodicity based on the at least one burst configuration bit.

In combination with any of the above features, the MAC-CE message may include at least two octets, the at least one memory may store instructions that, when executed by the at least one processor, cause the apparatus to determine the sensing signal burst configuration based on two least significant bits of an octet among the at least two octets.

In combination with any of the above features, the octet may be a second of the at least two octets.

In combination with any of the above features, the MAC-CE message may include at least 4 octets, and the at least one memory may store instructions that, when executed by the at least one processor, cause the apparatus to determine the sensing signal burst configuration based on least significant bits of at least one octet starting from octet 4.

According to at least one example embodiment, an apparatus includes at least one processor, and at least one memory storing instructions that, when executed by the at least one processor, cause the apparatus to generate a medium access control (MAC)-control element (CE) message indicating a sensing signal burst configuration, the sensing signal burst configuration including at least one of a burst periodicity or a burst length of a sensing signal burst, and transmit the MAC-CE message to a device.

The at least one memory may store instructions that, when executed by the at least one processor, cause the apparatus to determine a Doppler shift based on a received sensing signal burst.

In combination with any of the above features, the at least one memory may store instructions that, when executed by the at least one processor, cause the apparatus to determine a speed of an object based on the Doppler shift.

In combination with any of the above features, the received signal burst may be received from the device, and the received signal burst may be configured according to the sensing signal burst configuration.

In combination with any of the above features, the sensing signal burst may be a sounding reference signal (SRS) transmission.

In combination with any of the above features, the MAC-CE message may be a semi-persistent (SP) sounding reference signal (SRS) Activation/Deactivation MAC-CE message.

In combination with any of the above features, the MAC-CE message may include at least one burst configuration bit indicating the sensing signal burst configuration.

In combination with any of the above features, the at least one burst configuration bit may indicate a scaling factor of the burst length.

In combination with any of the above features, the MAC-CE message may include at least two octets, and two least significant bits of the second octet among the at least two octets may indicate the sensing signal burst configuration.

In combination with any of the above features, the MAC-CE message may include at least 4 octets, and least significant bits of at least one octet starting from octet 4 may indicate the sensing signal burst configuration.

According to at least one example embodiment, an apparatus includes at least one processor, and at least one memory storing instructions that, when executed by the at least one processor, cause the apparatus to receive a sensing signal burst transmitted according to a sensing signal burst configuration, the sensing signal burst configuration including at least one of a burst periodicity or a burst length of a sensing signal burst, and the sensing signal burst configuration having been determined based on a medium access control (MAC)-control element (CE) message, and determine a Doppler shift based on the sensing signal burst.

The sensing signal burst may be a sounding reference signal (SRS) transmission.

In combination with any of the above features, the MAC-CE message may be a semi-persistent (SP) sounding reference signal (SRS) Activation/Deactivation MAC-CE message.

In combination with any of the above features, the at least one memory may store instructions that, when executed by the at least one processor, cause the apparatus to determine a speed of an object based on the Doppler shift.

In combination with any of the above features, the sensing signal burst is received from a first device, the first device being different from a device having transmitted the MAC-CE message.

According to at least one example embodiment, a method includes receiving a medium access control (MAC)-control element (CE) message, determining a sensing signal burst configuration based on the MAC-CE message, the sensing signal burst configuration including at least one of a burst periodicity or a burst length of a sensing signal burst, and transmitting the sensing signal burst according to the sensing signal burst configuration.

According to at least one example embodiment, a method includes generating a medium access control (MAC)-control element (CE) message indicating a sensing signal burst configuration, the sensing signal burst configuration including at least one of a burst periodicity or a burst length of a sensing signal burst, and transmitting the MAC-CE message to a device.

According to at least one example embodiment, a method includes receiving a sensing signal burst transmitted according to a sensing signal burst configuration, the sensing signal burst configuration including at least one of a burst periodicity or a burst length of a sensing signal burst, and the sensing signal burst configuration having been determined based on a medium access control (MAC)-control element (CE) message, and determining a Doppler shift based on the sensing signal burst.

According to at least one example embodiment, a non-transitory computer-readable storage medium may store computer-readable instructions that, when executed by at least one processor at an apparatus, cause the apparatus to receive a medium access control (MAC)-control element (CE) message, determine a sensing signal burst configuration based on the MAC-CE message, the sensing signal burst configuration including at least one of a burst periodicity or a burst length of a signal burst, and transmit the sensing signal burst according to the sensing signal burst configuration.

According to at least one example embodiment, a non-transitory computer-readable storage medium may store computer-readable instructions that, when executed by at least one processor at an apparatus, cause the apparatus to generate a medium access control (MAC)-control element (CE) message indicating a sensing signal burst configuration, the sensing signal burst configuration including at least one of a burst periodicity or a burst length of a sensing signal burst, and transmit the MAC-CE message to a device.

According to at least one example embodiment, a non-transitory computer-readable storage medium may store computer-readable instructions that, when executed by at least one processor at an apparatus, cause the apparatus to receive a sensing signal burst transmitted according to a sensing signal burst configuration, the sensing signal burst configuration including at least one of a burst periodicity or a burst length for the sensing signal burst, and the sensing signal burst configuration having been determined based on a medium access control (MAC)-control element (CE) message, and determine a Doppler shift based on the sensing signal burst.

According to at least one example embodiment, an apparatus includes a means for receiving a medium access control (MAC)-control element (CE) message, a means for determining a sensing signal burst configuration based on the MAC-CE message, the sensing signal burst configuration including at least one of a burst periodicity or a burst length of a sensing signal burst, and a means for transmitting the sensing signal burst according to the sensing signal burst configuration.

According to at least one example embodiment, an apparatus includes a means for generating a medium access control (MAC)-control element (CE) message indicating a sensing signal burst configuration, the sensing signal burst configuration including at least one of a burst periodicity or a burst length of a sensing signal burst, and a means for transmitting the MAC-CE message to a device.

According to at least one example embodiment, an apparatus includes a means for receiving a sensing signal burst transmitted according to a sensing signal burst configuration, the sensing signal burst configuration including at least one of a burst periodicity or a burst length of a sensing signal burst, and the sensing signal burst configuration having been determined based on a medium access control (MAC)-control element (CE) message, and a means for determining a Doppler shift based on the sensing signal burst.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 1 illustrates an example of a burst signal transmission.

FIG. 2 is a Sounding Reference Signal (SRS) Resource Set Configuration Parameter according to the 3rd Generation Partnership Project (3GPP) 5G New Radio (NR) specification.

FIGS. 9A-9C are examples of tables for mapping burst configuration bits, according to example embodiments.

FIG. 10 illustrates an example of an SRS-PeriodicityAndOffset configuration parameter, according to example embodiments.

DETAILED DESCRIPTION

Figure 3:
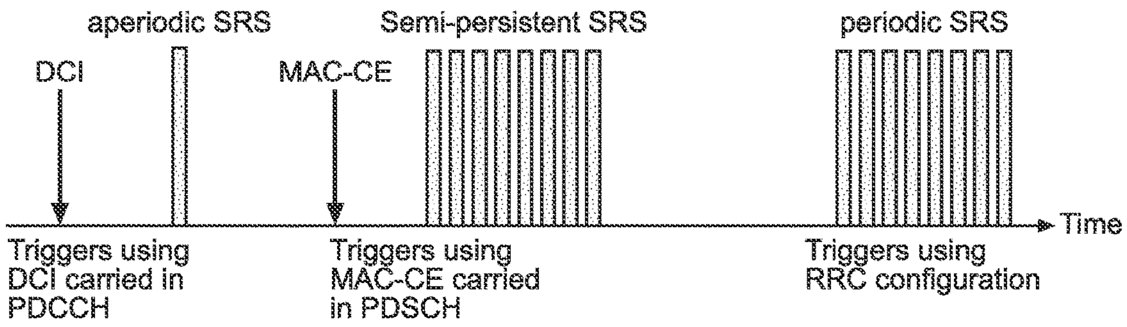
FIG. 3 illustrates a time behavior of aperiodic, semi-persistent, and periodic SRS transmissions.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio access network (RAN) or radio network elements (e.g., a gNB), user equipment (UE), or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

As discussed herein the terminology "one or more" and "at least one" may be used interchangeably.

As discussed herein, a gNB may also be referred to as a base station, access point, enhanced NodeB (eNodeB), or more generally, a radio access network element, radio network element, or network node. A UE may also be referred to herein as a mobile station, and may include a mobile phone, a cell phone, a smartphone, a handset, a personal digital assistant (PDA), a tablet, a laptop computer, a phablet, or the like.

It will be appreciated that a number of example embodiments may be used in combination.

Sensing applications may offer a relatively high resolution in that sensing applications may have the capability to discriminate between close targets. Sensing applications may also be able to tolerate relatively high maximum values of parameter(s) of interest to be sensed. For Doppler (or velocity/speed, which are used interchangeably hereinafter) sensing, which leverages reflections with the environment generated by signals transmitted periodically over time, this leads to the requirements of 1) being able to distinguish targets moving at similar velocities (relatively high velocity resolution $\Delta v$), while 2) allowing for relatively high maximum velocities (relatively high unambiguous velocity $v_{max}$). Sensing applications may utilize a burst Sounding Reference Signal (SRS) transmission to determine a Doppler shift.

One or more example embodiments provide mechanisms to achieve a desired Doppler sensing resolution without indefinite length SRS transmissions or continuous MAC-CE signaling. In one example, mechanisms described herein utilize MAC-CE extensions to configure SRS burst transmission with easier deployment in 5G-A. More specifically, for example, reserved bits in the semi-persistent (SP) SRS Activation/Deactivation MAC-CE message carrying the activation/deactivation command for SP SRS may be expanded for configuration of SRS burst transmission. Thus, according to one or more example embodiments, the gNB may provide a UE with both the activation/deactivation command and the configuration for the SRS burst transmission in the SP SRS Activation/Deactivation MAC-CE message.

Generally, sensing applications may utilize burst transmissions of signals having a burst length $T_{Burst}$ and a periodicity $T_{Per}$. Burst length $T_{Burst}$ refers to how long a burst of signals must be transmitted and periodicity $T_{Per}$ refers to the minimum time between consecutive signal transmissions within a burst. From the known formulas for $\Delta v$ and $v_{max}$, the requirements for the burst length $T_{Burst}$ can be calculated according to Equation 1 and the periodicity $T_{Per}$ can be calculated according to Equation 2, where c is the speed of light and $f_c$ denotes the carrier frequency.

$$T_{Burst} > \frac{c}{2 * \Delta v * f_c} \quad \text{Equation 1}$$

$$T_{Per} < \frac{c}{2 * f_c * v_{max}} \quad \text{Equation 2}$$

FIG. 1 illustrates an example of a bursty signal transmission.

Referring to FIG. 1, it can be seen from Equations 1 and 2 that more stringent requirements on $\Delta v$ and $v_{max}$ lead to a larger and shorter burst length $T_{Burst}$ and periodicity $T_{Per}$, respectively. Therefore, relatively good Doppler sensing performance may be achieved via burst like transmissions of pilot symbols over a long enough time and with a certain periodicity.

The following are numerical examples for typical use cases.

As a first example, for an indoor factory scenario (e.g., sensing automated guided vehicles (AGVs) or humans) in frequency range FR1 with $f_c$=3.5 GHZ, requirements of $\Delta v$=0.5 m/s and $v_{max}$=10 m/s are assumed. In this case, Equation 1 and Equation 2 yields a minimum burst duration of $T_{Burst}$>85.7 ms and a maximum periodicity of $T_{Per}$<4.3 ms.

In another example, for an outdoor use case (e.g., sensing cars on a highway), the requirement on $\Delta v$ may be relaxed, but a higher $v_{max}$ must be tolerated. Assuming $\Delta v$=2 m/s and $v_{max}$=40 m/s, using Equation 1 and Equation 2 leads to $T_{Burst}$>21.4 ms and $T_{Per}$<1.1 ms.

The requirements can be formulated in the same way for frequency range 2 (FR2), where the higher carrier frequencies allow for shorter burst lengths to achieve the same resolution performance, and at the same time also require a shorter periodicity to achieve the same unambiguous velocity $v_{max}$.

3rd Generation Partnership Project (3GPP) specifications provide different pilot symbols that may also be re-used for sensing purposes. A straightforward approach to do so may be to extend the application of pilot symbols that are already used for positioning to also be used for sensing purposes. However, this approach is not only resource-hungry, but would also result in considerable signaling overhead, rendering the approach inefficient.

Sounding reference signal (SRS) is an uplink (UL) reference signal that is transmitted according to instruction from the gNB. The gNB measures the UL channel from SRS. The gNB may use the measurement for: UL channel scheduling and link adaptation; downlink (DL) channel estimation when UL/DL channel reciprocity exists; non-codebook based transmissions to instruct a user equipment (UE) to choose UE-generated precoding weights for transmission of Physical Uplink Shared Channel (PUSCH); codebook based transmissions to instruct the UE to select the antenna ports used for PUSCH and to select Rank and precoding weights that are included in the specification; and/or UL beam management when a communication link between the UE and the gNB does not support uplink-downlink beam correspondence.

FIG. 2 is an SRS Resource Set Configuration Parameter according to 5G NR specification.

Referring to FIG. 2, in 5G NR, a UE may be configured with one or more SRS Resource Set(s), wherein every SRS Resource Set is associated with one or more SRS Resources. In particular, some of the configuration parameters of SRS are done at the set level and some at the resource level. For instance, the SRS triggering mechanism is configured at the set level, as may be seen in FIG. 2 at the SRS-ResourceSet RRC parameter structure. Here, the SRS triggering mechanism is indirectly set via the parameter resourceType. In other words, resourceType implicitly determines the type of triggering mechanism.

Current 5G NR specifications support three different types (triggering mechanisms) for resourceType. Namely, aperiodic, semi-persistent, and periodic.

FIG. 3 illustrates a time behavior of aperiodic, semi-persistent, and periodic SRS transmissions.

Aperiodic SRS transmission is triggered by Layer-1 (L1) downlink control information (DCI) transmitted on the Physical Downlink Control Channel (PDCCH).

Semi-persistent SRS transmission is triggered using a Medium Access Control (MAC)-Control Element (CE), which is sent via the Physical Downlink Shared Channel (PDSCH) to activate an SRS Resource Set or to deactivate an already activated SRS Resource Set.

Periodic SRS transmission does not require an activation or deactivation mechanism and upon successful reception of SRS Resource Set configuration parameter structure via the RRC layer, the UE starts to transmit SRS at particular time instances.

SRS can be used for the purposes outlined above as well as for positioning with configuration options given in TS 38.331 "Radio Resource Control (RRC) Protocol specification," the contents of which are incorporated herein by reference.

One design factor of an SRS burst configuration is periodicity of each type of transmission (aperiodic, semi-persistent and periodic).

In subchapter "SRS-Config" of clause 6.3.2 "Radio resource control information elements" it is defined that semi-persistent and periodic SRS can be configured to be transmitted in every slot with "SRS-PeriodicityAndOffset" parameter. Given the possible subcarrier spacings ranging from 15 to 240 kHz, this allows minimum periodicity configurations in the range from 1 to 0.0625 ms (i.e., corresponding to the slot duration). As discussed above in Examples 1 and 2, this should be enough to tolerate the maximum possible speed in most relevant use cases.

On the other hand, for aperiodic SRS transmission, multiple DCI signaling is required to construct the desired periodicity, thereby increasing signaling overhead.

Therefore, as far as the periodicity is concerned, the SRS-PeriodicityAndOffset parameter, associated with semi-persistent and periodic SRS transmissions, can be exploited to configure the desired value for the periodicity.

Another design factor of the SRS burst configuration is the burst length. One intuitive solution to fulfil the design requirement for the burst length is to have continuous SRS transmissions. Such continuous periodic transmissions would in principle allow for an "arbitrary" resolution, because the burst duration for sensing—and as a consequence the velocity resolution—can be chosen freely. However, this continuous transmission comes at the cost of wasting relatively large amounts of resources, which is not desirable, because periodic transmission of the burst does not end without a MAC-CE deactivation message with semi-persistent scheduling (SPS). Furthermore, continuous transmission of SRS with short periodicities would be highly energy-inefficient and limit the number of UEs that can be served.

In order to be able to reduce or eliminate this problem (i.e., avoiding continuous SRS transmissions), while fulfilling the required burst length, one solution would be to interrupt the continuous SRS transmission, i.e., having SRS transmission for a certain duration, followed by a silent period, and again retransmission of SRS. In other words, utilizing burst SRS transmissions with a certain burst periodicity for a total duration satisfying the minimum required burst length.

Example embodiments provide mechanisms for utilizing triggering mechanisms currently in the specifications described above, to construct burst like SRS transmission, herein referred to as SRS burst transmission. SRS burst transmissions may be configured as aperiodic, semi-persistent, or periodic SRS transmission but with extensive signaling overhead.

Figure 4:
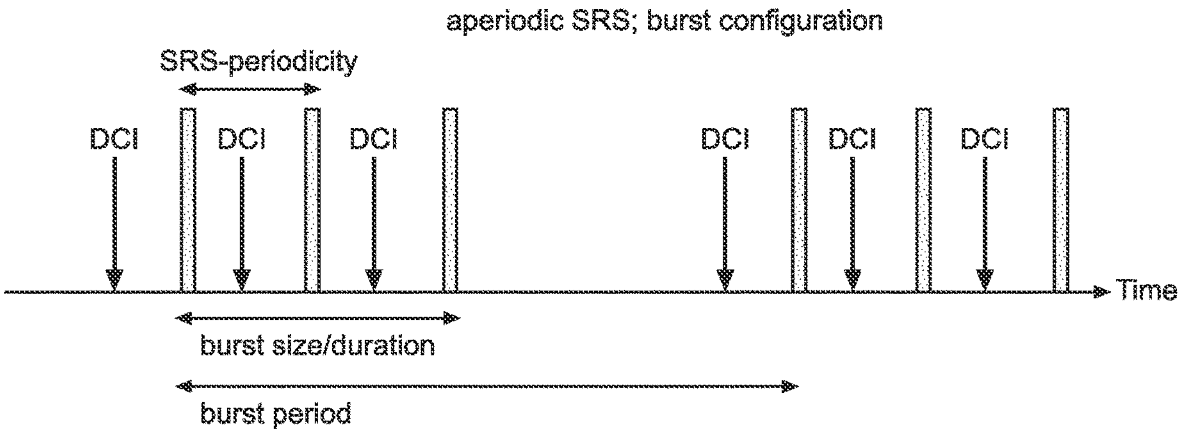
FIG. 4 illustrates an example of an aperiodic SRS burst transmission.

FIG. 4 illustrates an example of an aperiodic SRS burst transmission at, for example, a UE.

Referring to FIG. 4, a SRS burst transmission and its burst triggering configuration is illustrated. As shown in FIG. 4, extensive DCI signaling overhead is required to force aperiodic SRS transmission to have burst time-domain behavior, which is not a practical solution. As discussed herein, SRS-periodicity may be equivalent to $T_{Per}$ and burst size/duration may be equivalent to burst length $T_{Burst}$.

Figure 5:
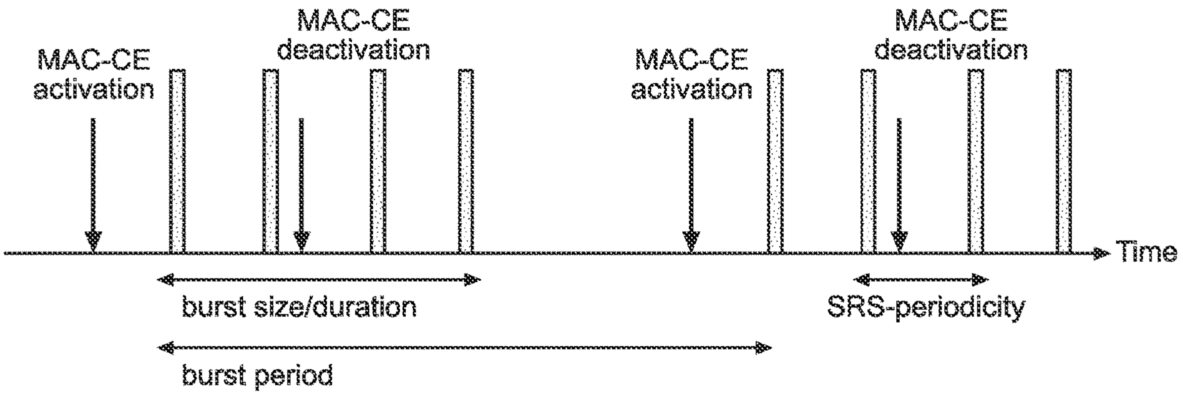
FIG. 5 illustrates an example of a semi-persistent SRS burst transmission.

FIG. 5 illustrates an example of a semi-persistent (SP) SRS burst transmission at, for example, a UE.

Referring to FIG. 5, SP SRS transmission may also be configured to achieve the required burst size/duration $T_{Burst}$ and periodicity $T_{Per}$. As shown, however, this would require activation and deactivation of the SRS transmissions with MAC-CEs at every burst, incurring a relatively large signaling overhead. Moreover, due to the possible errors in MAC-CE transmissions, there is no guarantee on the starting time of semi-persistent SRS transmissions activated by MAC-CEs, which may hinder coordination of transmissions over multiple cells. Coordinating the transmissions over multiple cells may be necessary in sensing to control interference, like with PRS in DL and their muting patterns.

Figure 6:
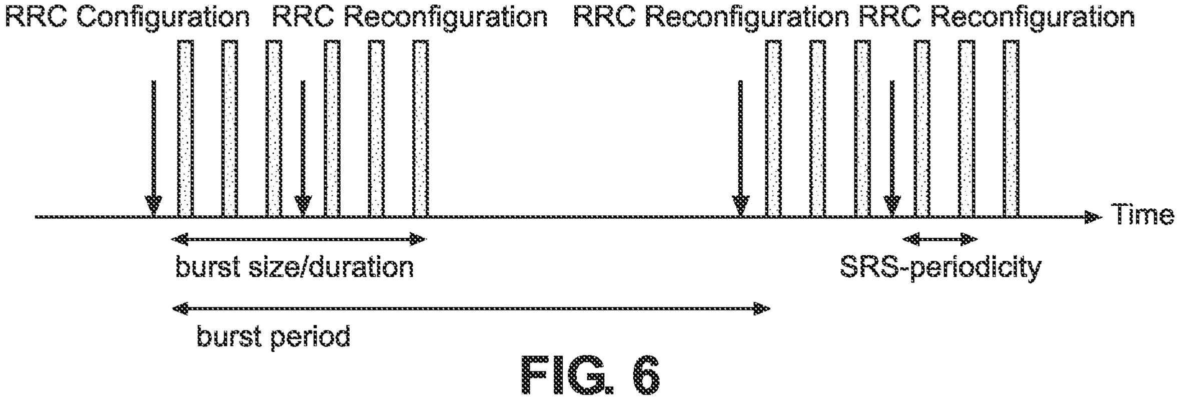
FIG. 6 illustrates an example of a periodic SRS burst transmission.

FIG. 6 illustrates an example of a periodic SRS burst transmission at, for example, a UE.

Referring to FIG. 6, as shown, no triggering mechanism is required for periodic SRS burst transmission. Rather, after receiving the RRC configuration, a UE transmits SRS at determined time instances.

The configuration shown in FIG. 6, however, requires many RRC (re)-configurations, which is a relatively resource-intensive procedure, that needs to be used with care, because it introduces the risk of the UE losing the connection to the network.

Thus, as discussed above, the current specification and conventional methods could better support configuration for SRS burst transmission. Further, to the extent that the current specification may be used to allow for configuration of aperiodic, semi-persistent, or periodic SRS burst transmission, such configuration comes at the cost of introducing relatively large signaling overhead.

One or more example embodiments provide mechanisms to achieve a desired Doppler sensing resolution without indefinite length SRS transmissions or continuous MAC-CE signaling. In one example, mechanisms described herein utilize MAC-CE extensions to configure SRS burst transmission with easier deployment in 5G-A. More specifically, for example, reserved bits in the SP SRS Activation/Deactivation MAC-CE message carrying the activation/deactivation command for SP SRS may be expanded for configuration of SRS burst transmission.

Figure 7:
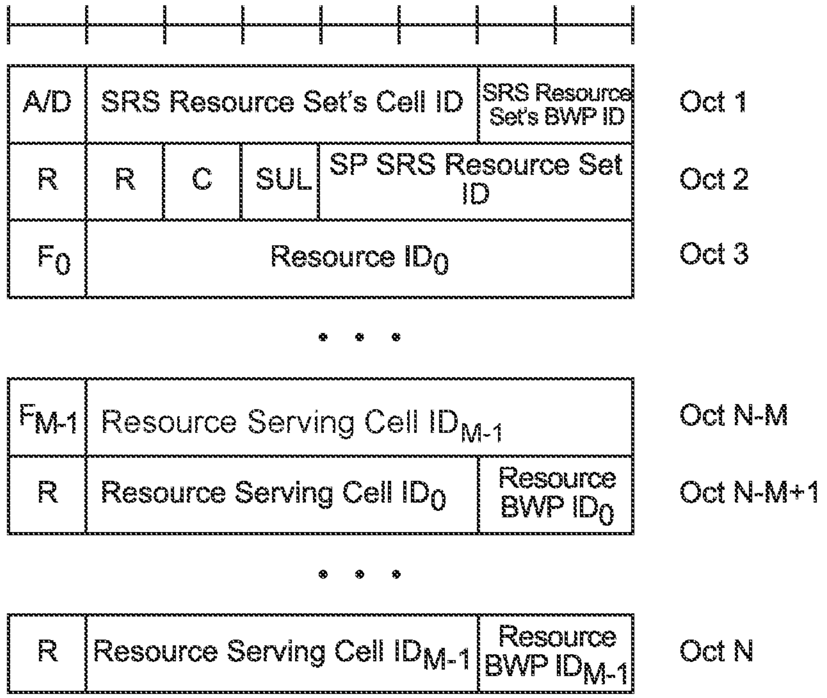
FIG. 7 is an illustration of a structure of semi-persistent (SP) SRS activation/deactivation according to TS 38.321, clause 6.1.3.17.

FIG. 7 is an illustration of a structure of SP SRS activation/deactivation according to TS 38.321, clause 6.1.3.17.

Referring to FIG. 7, an SP SRS activation/deactivation structure included in a MAC-CE message includes at least two reserved bits R in a second octet Oct 2. The two reserved bits R may be the least significant bits in the second octet Oct 2. According to example embodiments, the reserved bits R may be used for configuration of SRS burst transmission to enhance SP SRS transmissions to have burst like time-domain behavior. The reserved bits R used for the configuration of SRS burst transmission may be referred to as burst configuration bits.

As shown in FIG. 7, in addition to the two reserved bits R in the second octet Oct 2, further reserved bits may be included in the octets starting from Oct N−M+1 to Oct N. These further reserved bits may be used as the burst configuration bits in addition to, or instead of, the two reserved bits R in the second octet Oct 2 for configuration of the SRS burst transmission.

According to example embodiments, the two reserved bits in the second octet Oct 2 of the SP SRS Activation/Deactivation MAC-CE may be used as the burst configuration bits to carry (or indicate) information regarding the activation duration (e.g., burst size/duration to achieve a certain desired burst duration $T_{Burst}$). Thus, the SP SRS Activation/Deactivation MAC-CE, according to example embodiments, concurrently carries, conveys, or indicates both the activation command for the SRS burst transmission and the burst duration in which SP SRS is to be transmitted.

In some example embodiments, only one reserve bit of the SP SRS Activation/Deactivation MAC-CE may be used as a burst configuration bit.

Figure 8:
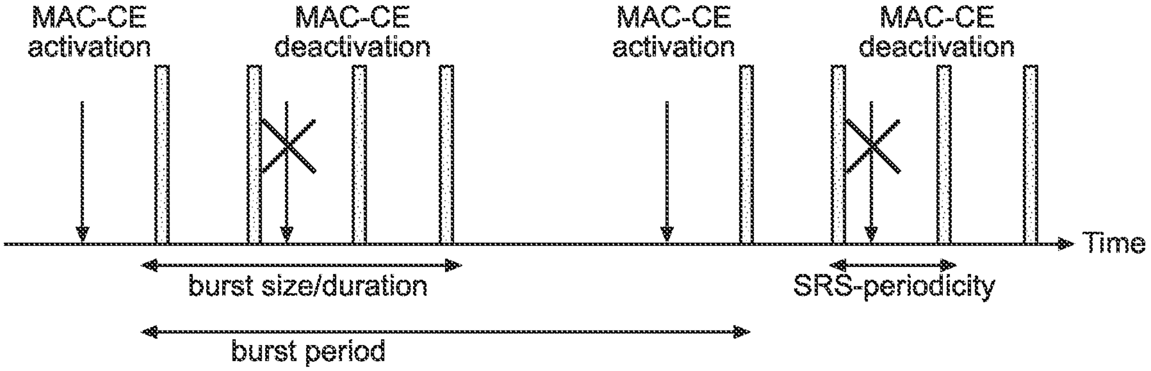
FIG. 8 illustrates an example of a SP SRS burst transmission according to example embodiments.

FIG. 8 illustrates an example of a SP SRS burst transmission according to example embodiments.

Referring to FIG. 8, the number of MAC-CE deactivation commands needed is reduced and the signaling overhead associated with the SP SRS for burst like transmissions is reduced (e.g., by a factor of two) as compared to the semi-persistent burst transmission shown in FIG. 5.

For configuration of burst periodicity as shown in FIG. 8, another MAC-CE activation command must be transmitted. Therefore, this method may still introduce moderate signaling overhead.

To convey activation duration values for a given SP SRS burst transmission, according to example embodiments, two reserved bits, denoted here by $b_0b_1$, may be mapped to predefined (or alternately defined or given) activation duration values (or other parameters, such as scaling factor) that are included in the specifications. For example, 01 may be mapped to an activation duration value of 2 slots.

FIGS. 9A-9C are examples of tables for mapping burst configuration bits, according to example embodiments.

Referring to FIG. 9A, three different activation durations (burst size/durations) (10, 20, 40 slots) are included in the specification. Notably, several mapping strategies may be adopted to construct similar tables. In the table shown in FIG. 9A, duration values of 10, 20, and 40 slots are chosen as one example mapping rule, however, example embodiments are not limited thereto.

According to example embodiments, a more general mapping strategy for the burst configuration bits, denoted by $b_0b_1$ may be employed. For example, the burst configuration bits may indicate the exponent of a fixed basis B and fixed (and potentially configurable) mantissa M (i.e., $b_0b_1$ selects k in $M \times B^k$. The table shown in FIG. 9A corresponds with the special case wherein M=5 and B=2. As another example, the table shown in FIG. 9B corresponds with the case wherein M=1 and B=1. The values of M and B may be configured at the semi-persistent scheduling (SPS) configuration of SRS signal (e.g., by enhancing current RRC specifications).

According to some example embodiments, burst configuration bits $b_0b_1$ may be mapped to different predefined (or alternately defined or given) scaling factors, denoted by k, and the activation duration may be subsequently determined based on the value of the scaling factor k and the value of SRS-PeriodicityAndOffset. This may allow for configuration of a higher dynamic range for burst size/duration.

FIG. 10 illustrates an example of an SRS-PeriodicityAndOffset configuration parameter, according to example embodiments. The SRS-PeriodicityAndOffset configuration parameter may be utilized in conjunction with scaling factor k to determine activation duration (burst length).

Referring to FIG. 10, SRS-PeriodicityAndOffset may take one of the values denoted by $T_{SRS\text{-}PeriodicityAndOffset}$, where $T_{SRS\text{-}PeriodicityAndOffset}$=sl1 means periodicity of 1 slot, $T_{SRS\text{-}PeriodicityAndOffset}$=sl2 means periodicity of 2 slots, and so on.

According to example embodiments, the burst size/duration (e.g., activation period) may be calculated based on the value of the SRS-PeriodicityAndOffset and the scaling factor according to Equation 3.

$$T_{SRS,Burst} = k * T_{SRS-PeriodicityAndOffset} \quad \text{Equation 3}$$

As noted above, the value of k may be determined by the burst configuration bits $b_0b_1$. FIG. 9C illustrates a table associating burst configuration bits $b_0b_1$ to respective scaling factors k. It is noted that the values 1, 2, 3, shown in FIG. 9C are for example purposes only, and example embodiments are not limited to these values.

As shown in FIG. 9C, three different scaling factors may be included in the specification or provided to the UE via a higher layer RRC signaling. In one example, scaling factors k={1,2,3}. In another example, scaling factors k={2,3,4}.

Figures 11, 12:
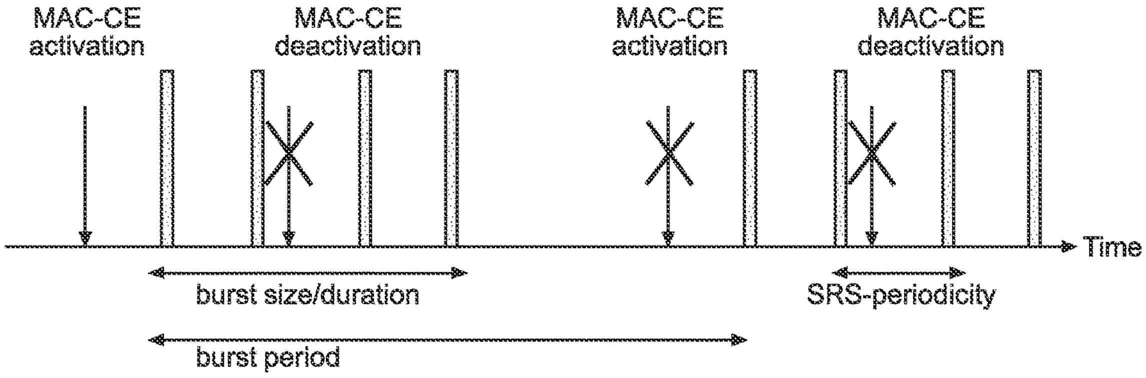
FIG. 11 illustrates an example of a SP SRS burst transmission according to example embodiments.
FIG. 12 is an example of a table for mapping burst configuration bits, according to example embodiments.

FIG. 11 illustrates an example of another SP SRS burst transmission according to example embodiments.

In the example embodiment shown in FIG. 11, MAC-CE signaling overhead may be further reduced by indicating both burst size/duration and burst periodicity via the two burst configuration bits. For example, the two reserved bits R in the second octet Oct 2 in FIG. 7 may be used as burst configuration bits to carry the information on both activation duration (i.e., burst size/duration $T_{Burst}$) and burst periodicity (i.e., periodicity $T_{Per}$).

In this case, two burst configuration bits, also denoted here by $b_0b_1$, may be mapped to predefined (or alternately defined or given) activation duration values. The values may be included in the specification or may be configured by RRC configuration enhancing SPS configuration. For example, 01 may be mapped to an activation duration value of 2 slots and a burst periodicity of 160 slots. In one example, the two burst configuration bits $b_0b_1$ may indicate a row of a table with two columns, wherein a first column indicates burst size/duration and a second column indicates burst periodicity. The table may be included in the specification or provided to the UE by higher layer RRC signaling. For example, the table may be configured by RRC configuration enhancing SPS configuration of SRS signal. For example, the values in the tables may be configured by information element (IE) definition in the RRC message that configures SRS-SPS. The configuration may accomplished by directly configuring the entries in the tables, or by configuring the parameters that generate the entries according to an algorithm.

FIG. 12 is an example of a table for mapping burst configuration bits, according to example embodiments.

Referring to FIG. 12, the burst configuration bits $b_0b_1$ indicate burst size/duration and burst periodicity. As shown, the table may include activation duration (burst size/duration) of 10, 20, 40 slots and corresponding burst periodicities of 160, 320, 640 slots. However, these values are only for example purposes, and example embodiments are not limited thereto.

Figure 13:
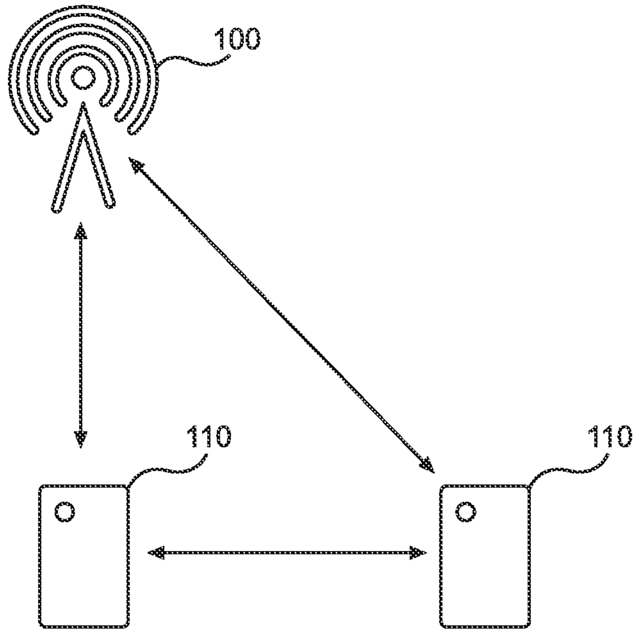
FIG. 13 illustrates a simplified diagram of a portion of a 3GPP 5G NR access deployment for explaining example embodiments.

FIG. 13 illustrates a simplified diagram of a portion of a 3GPP NR access deployment for explaining example embodiments.

As shown in FIG. 13, the portion of the 3GPP NR access deployment includes UEs 110 and a gNB 100. In one example, the gNB 100 provides cellular resources for the UEs 110 within a geographical coverage area. The gNB 100 also communicates with a core network (not shown), which is sometimes referred to as the New Core in 3GPP NR. In one example, in addition to the operations described herein, the UEs 110 and the gNB 100 may communicate according to one or more of the 3GPP New Radio (NR) standards.

Figure 14:
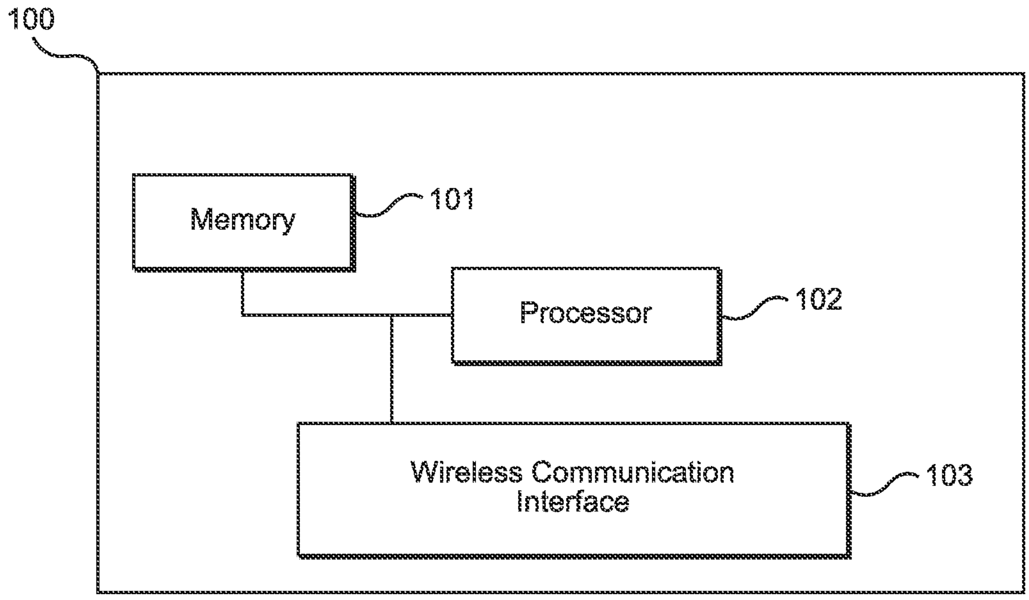
FIG. 14 is a block diagram illustrating an example embodiment of a gNB according to example embodiments.

FIG. 14 is a block diagram illustrating an example embodiment of a gNB according to example embodiments.

Referring to FIG. 14, the gNB 100 may also be referred to as a base station, access point, enhanced NodeB (eNodeB), or more generally, a radio access network element, radio network element, or network node. The gNB 100 may include a memory 101, processing circuitry (such as at least one processor 102), and/or a wireless communication interface 103. The memory 101 may include various special purpose program code including computer executable instructions which may cause the gNB 100 to perform the one or more of the methods of the example embodiments. The wireless communication interface may include a PC5 air interface.

In at least one example embodiment, the processing circuitry may include at least one processor (and/or processor cores, distributed processors, networked processors, etc.), such as the at least one processor 102, which may be configured to control one or more elements of the gNB 100, and thereby cause the gNB 100 to perform various operations. The processing circuitry (e.g., the at least one processor 102, etc.) is configured to execute processes by retrieving program code (e.g., computer readable instructions) and data from the memory 101 to process them, thereby executing special purpose control and functions of the entire gNB 100. Once the special purpose program instructions are loaded into, (e.g., the at least one processor 102, etc.), the at least one processor 102 executes the special purpose program instructions, thereby transforming the at least one processor 102 into a special purpose processor.

In at least one example embodiment, the memory 101 may be a non-transitory computer-readable storage medium and may include a random access memory (RAM), a read only memory (ROM), and/or a permanent mass storage device such as a disk drive, or a solid state drive. Stored in the memory 101 is program code (i.e., computer readable instructions) related to operating the gNB 100.

Figure 15:
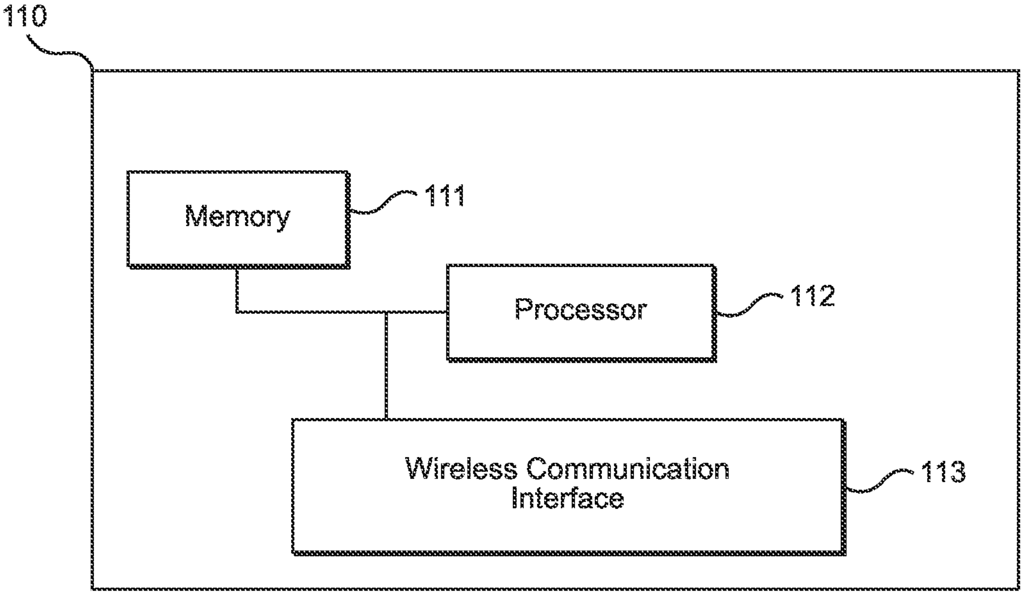
FIG. 15 is a block diagram illustrating an example embodiment of a UE according to example embodiments.

FIG. 15 is a block diagram illustrating an example embodiment of a UE according to example embodiments.

Referring to FIG. 15, the UE may include a memory 111, processing circuitry (such as at least one processor 112), and/or a wireless communication interface 113. The UE 110 may be any one of, but not limited to, a mobile device, a smartphone, a tablet, a laptop computer, a desktop computer and/or the like.

Descriptions of the memory 111, the processor 112, and the wireless communication interface 113 may be substantially similar to the memory 101, the processor 102, and the communication interface 103, respectively, and are therefore omitted.

Figure 16:
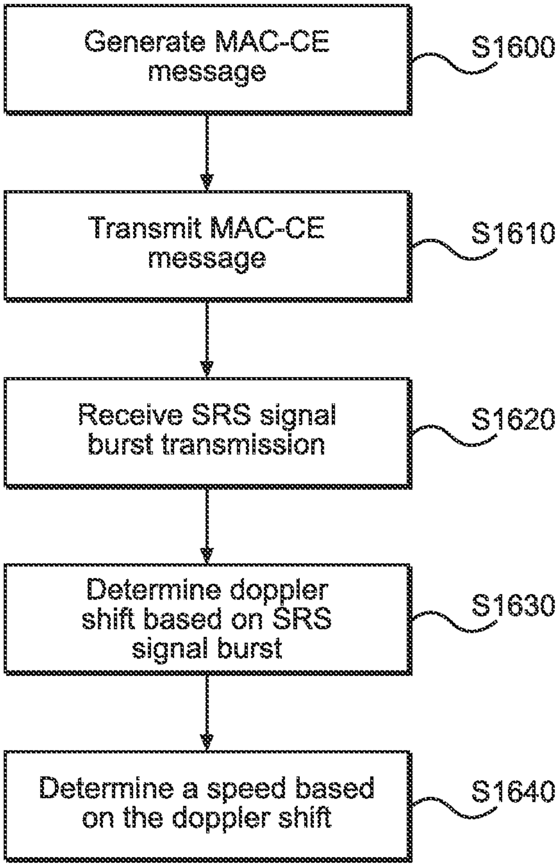
FIG. 16 is a flowchart illustrating a method according to example embodiments.

FIG. 16 is a flowchart illustrating a method according to example embodiments. The method shown in FIG. 16 may be performed at the gNB 100 to determine Doppler shift associated with and/or a speed of the UE 110.

Referring to FIG. 16, at S1600 the gNB 100 generates a MAC-CE (e.g., SP SRS Activation/Deactivation MAC-CE) message. For example, the gNB 100 may generate the MAC-CE message including burst configuration bits denoted by $b_0b_1$, as described above. The gNB 100 may generate the MAC-CE message such that the desired configuration (e.g., burst size/duration and/or burst periodicity) for a SRS burst transmission is indicated by the burst configuration bits included in the MAC-CE. For example, the configuration may be carried by the least significant bits of the second octet Oct 2 of the SP SRS Activation/Deactivation MAC-CE. Alternatively, the configuration may be carried by other reserved bits included in the SP SRS Activation/Deactivation MAC-CE.

At S1610, the gNB 100 transmits the MAC-CE message to the UE 110. For example, according to an example embodiment, the burst configuration bits may indicate a burst size/duration of the burst transmission and the gNB 100 may transmit the activation MAC-CE message to the UE 110 periodically, as described above with regard to FIG. 8. In another embodiment, the MAC-CE may indicate the burst size/duration and the burst periodicity of the burst transmission. Accordingly, in this embodiment, the gNB 100 may transmit one (e.g., only one) activation MAC-CE message as described above with regard to FIG. 11.

At S1620, the gNB 100 receives a SRS signal burst transmission from the UE 110, according to the configuration indicated by the burst configuration bits $b_0b_1$ included in the MAC-CE message from the gNB 100. For example, the UE 110 may transmit the signal burst transmission as described above with regard to FIGS. 8 and 11.

At S1630, the gNB 100 determines a Doppler shift associated with the UE 110 based on the received SRS signal burst transmission. For example, the gNB 100 may determine a receive frequency relative to a transmit frequency of each received SRS signal of the SRS signal burst transmission (e.g., each ray, signal, path, and/or object of the signal burst transmission).

For example, the gNB 100 may take a Fourier transform (or a discrete Fourier transform (DFT) or a fast Fourier transform (FFT)) across multiple received orthogonal frequency-division multiplexing (OFDM) symbols in time where the SRS have been transmitted. The Fourier transform may be used as a representation of the signal in the Doppler domain. The gNB 100 may then search for peaks/strong components in Doppler domain representation. The location of the peaks/strong components in the Doppler domain is the Doppler estimate. However, example embodiments are not limited thereto and any known method for determining the Doppler shift may be employed.

As noted above, in one example, the gNB 100 may determine the Doppler shift of the UE 110 based on the received SRS signal burst transmission. According to other example embodiments, the gNB 100 may determine the Doppler shift of another object, (e.g., a car) based on the received SRS signal burst transmission. For example, the gNB 100 may use matching algorithms (e.g., Hungarian algorithm) to match the peaks/strong components in the Doppler domain with previously detected entities. The gNB 100 may determine which object the Doppler domain applies to based on the matching algorithm. For instance, only the closest path in range can be the transmitting UE 110 itself.

At S1640, the gNB 100 determines a speed based on the Doppler shift. The Doppler shift is directly proportional to the speed. The gNB 100 may determine the speed from the Doppler shift according to any known method.

Figure 17:
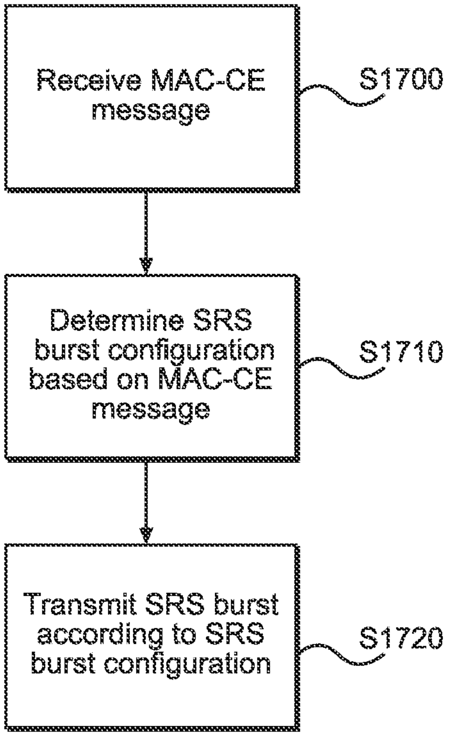
FIG. 17 is a flowchart illustrating a method according to example embodiments.

FIG. 17 is a flowchart illustrating a method according to example embodiments. The method shown in FIG. 17 may be performed at a UE 110.

At S1700, a UE 110 receives a MAC-CE (e.g., SP SRS Activation/Deactivation MAC-CE) message from the gNB 100. The received MAC-CE message may be a MAC-CE message generated by the gNB 100 at S1600 and transmitted at S1610, as described above.

At S1710, the UE 110 determines a configuration for a SRS signal burst transmission based on the MAC-CE message. For example, the UE 110 may extract, from the MAC-CE, the configuration carried by the burst configuration bits denoted by $b_0b_1$, as described above. The UE 110 may determine the burst configuration based on the burst configuration bits $b_0b_1$ according to the tables shown in FIGS. 9A-9C and 12, as described above. For example, the tables may be included in the specification or provided to the UE via a higher layer RRC signaling.

At S1720, the UE 110 transmits SRS signal burst transmissions according to the determined burst configuration. The UE 110 may transmit the SRS signal burst transmission to probe the environment and to allow reception of the SRS signal burst by a sensing receiver (e.g., the gNB 100 that transmitted the MAC-CE message, another gNB 100, and/or another UE 110). The SRS signal burst transmissions may include the SRS signal burst transmission, which is described above as being received at the gNB 100 at S1620 in FIG. 16. For example, the UE 110 may transmit the signal burst transmission as described above with regard to FIGS. 9 and 11.

Figure 18:
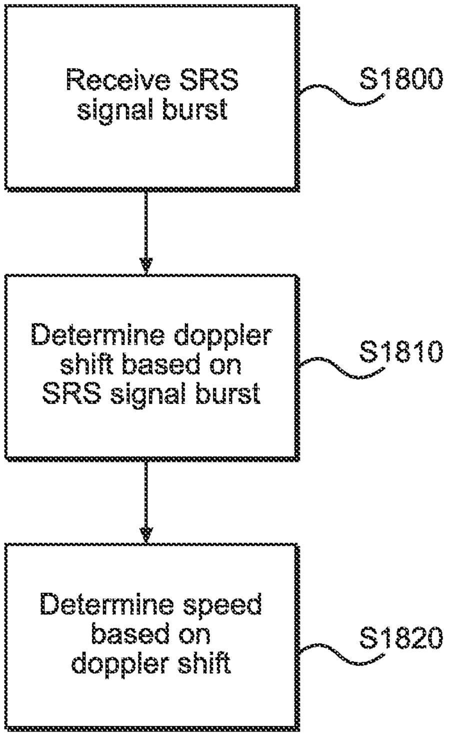
FIG. 18 is a flowchart illustrating a method according to example embodiments.

FIG. 18 is a flowchart illustrating a method according to example embodiments. The method shown in FIG. 18 may be performed at a UE (or other device or network element), which is different from the UE 110 having transmitted the SRS signal burst transmissions discussed above with regard to FIG. 17. For example purposes, however, the example embodiment shown in FIG. 18 will also be described with regard to a UE 110.

Referring to FIG. 18, at S1800 a UE 110 receives an SRS signal burst transmission. For example, the SRS signal burst transmission may be transmitted by another UE 110, as described above with regard to S1720 in FIG. 17.

At S1810, the UE 110 determines a Doppler shift based on the received SRS signal burst transmission. For example, the UE 110 may determine the Doppler shift based on the received SRS signal burst transmission and the burst configuration included in the MAC-CE message. For example, the UE 110 and the another UE 110 may both receive the MAC-CE message from the gNB 100. Step S1810 may be similar to S1630 described above. Accordingly, repeated description is omitted.

At S1820, the UE 110 determines a speed based on the determined Doppler shift. Step S1820 may be similar to S1540 described above. Accordingly, repeated description is omitted.

The precision of speed estimates based on Doppler shift, according to example embodiments, allows obtaining much finer information compared to speed estimates from mid/long-term position differences. For example, speed estimations based on Doppler profile, according to example embodiments, may allow for estimation of fan movement, human motions of different body parts (e.g., arms, legs, etc.) moving at different speeds, etc.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising." "includes," and/or "including." when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having." as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUS, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment configured to sense automated guided vehicles in an indoor factory, the user equipment comprising:

at least one processor; and at least one memory storing instructions that, when executed by the at least one processor, cause the user equipment at least to:

receive, from a base station, a medium access control (MAC)-control element (CE) message, wherein the MAC-CE message is a semi-persistent (SP) sounding reference signal (SRS) Activation/Deactivation MAC-CE message, and wherein the MAC-CE message includes two burst configuration bits;

receive, from the base station, a radio resource control (RRC) configuration message comprising a value of a PeriodicityAndOffset parameter;

determine a first sensing signal burst configuration based on the value of the PeriodicityAndOffset parameter and based on the two burst configuration bits in the MAC-CE message, the determining the first sensing signal burst configuration comprising:

determining a first burst periodicity as the value of the PeriodicityAndOffset parameter, accessing a mapping which maps different values of the two burst configuration bits to different values of a factor, determining a value k of the factor based on the mapping and based on a value of the two burst configuration bits, and determining a first burst length of a sensing signal burst by an equation $M \times B^k$, where M is a configurable value configured at a SP scheduling (SPS) configuration, and B is a fixed value configured at the SPS configuration;

transmit the first sensing signal burst according to the sensing signal burst configuration by transmitting a first plurality of pilot symbols at the first burst periodicity over the first burst length, wherein the first sensing signal burst is an SRS transmission;

receive a second sensing signal burst, transmitted by another user equipment, according to a second sensing signal burst configuration, the second sensing signal burst comprising a second plurality of pilot symbols transmitted at a second burst periodicity over a second burst length;

determine a Doppler shift based on the second sensing signal burst; and determine a speed of an automated guided vehicle of the indoor factory based on the Doppler shift.

2. The user equipment of claim 1, wherein the mapping maps values 01, 10, and 11 of the two burst configuration bits to values 2, 3, and 4 of the factor, respectively.

3. The user equipment of claim 2, wherein M=5 and B=2, wherein in case k=2, the first burst length is $M \times B^k = 5 \times 2^2 = 20$ slots, wherein in case k=3, the first burst length is $M \times B^k = 5 \times 2^3 = 40$ slots, and wherein in case k=4, the first burst length is $M \times B^k = 5 \times 2^4 = 80$ slots.

* * * * *